( 12 ) United States Patent
Lim et al.

(10) Patent No.: US 10,292,172 B2
(45) Date of Patent: May 14, 2019

(54) METHOD AND APPARATUS FOR TRANSMITTING PACKET IN SYSTEM PERFORMING D2D DIRECT COMMUNICATION

(71) Applicant: Samsung Electronics Co. Ltd., Suwon-si, Gyeonggi-do (KR)

(72) Inventors: Chi-Woo Lim, Suwon-si (KR); Kyung-Kyu Kim, Suwon-si (KR); Dae-Gyun Kim, Seongnam-si (KR); Seung-Hoon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 13/922,016

(22) Filed: Jun. 19, 2013

(65) Prior Publication Data

US 2013/0343298 A1 Dec. 26, 2013

(30) Foreign Application Priority Data

Jun. 20, 2012 (KR) ........................ 10-2012-0066259

(51) Int. Cl.
*H04L 1/00* (2006.01)
*H04W 52/24* (2009.01)
*H04W 52/28* (2009.01)
*H04W 52/38* (2009.01)
(Continued)

(52) U.S. Cl.
CPC ......... *H04W 72/085* (2013.01); *H04L 1/0007* (2013.01); *H04W 52/383* (2013.01); *H04W 72/1289* (2013.01); *H04L 1/0003* (2013.01); *H04W 52/242* (2013.01); *H04W 52/286* (2013.01)

(58) Field of Classification Search
CPC .... H04W 72/085; H04W 72/08; H04L 12/70; H04L 12/861
See application file for complete search history.

(56) References Cited

U.S. PATENT DOCUMENTS 4,835,731 A * 5/1989 Nazarenko et al. .......... 455/508
6,628,924 B1 * 9/2003 Miyamoto ..................... 455/69
(Continued)

FOREIGN PATENT DOCUMENTS

CN 101690040 A 3/2010
CN 102083138 A 6/2011
(Continued)

OTHER PUBLICATIONS

Lettieri, Paul and Srivastava, Mani; Adaptive Frame Length Control for Improving Wireless Link Throughput, Range, and Energy Efficiency; 1998; IEEE; pp. 564-571.*
(Continued)

*Primary Examiner* — Noel R Beharry
*Assistant Examiner* — Rodrick Mak
(74) *Attorney, Agent, or Firm* — Jefferson IP Law, LLP

(57) ABSTRACT

A method and an apparatus for transmitting a packet in a system performing a Device to Device (D2D) direct communication are provided. In the method, whether to transmit a small packet is determined. When small packet transmission is determined, at least one peripheral reception device is informed of whether the small packet is transmitted at a scheduling point.

20 Claims, 14 Drawing Sheets

(51) Int. Cl.
*H04W 72/08* (2009.01)
*H04W 72/12* (2009.01)

(56) References Cited

U.S. PATENT DOCUMENTS

| | | | | |
|---|---|---|---|---|
| 7,606,575 | B2* | 10/2009 | Mahany | G06F 1/163 |
| | | | | 455/452.2 |
| 7,613,138 | B2* | 11/2009 | Bahl | H04W 72/0406 |
| | | | | 370/230 |
| 7,697,952 | B2* | 4/2010 | Larsen | H04L 43/08 |
| | | | | 455/522 |
| 7,751,360 | B2* | 7/2010 | Yagyu | H04L 12/4625 |
| | | | | 370/328 |
| 9,215,693 | B2* | 12/2015 | Ahn | H04W 72/04 |
| 9,258,731 | B2* | 2/2016 | Dhillon | H04W 28/0231 |
| 2004/0203342 | A1 | 10/2004 | Sibecas et al. | |
| 2006/0140147 | A1* | 6/2006 | Van Bemmel | H04W 72/1278 |
| | | | | 370/329 |
| 2006/0148502 | A1 | 7/2006 | Korneluk et al. | |
| 2007/0049318 | A1* | 3/2007 | Qi et al. | 455/522 |
| 2007/0111744 | A1* | 5/2007 | Kondo | H04W 52/267 |
| | | | | 455/522 |
| 2007/0127366 | A1* | 6/2007 | Banks et al. | 370/222 |
| 2008/0220805 | A1* | 9/2008 | Dayal | H04W 52/10 |
| | | | | 455/522 |
| 2008/0310385 | A1* | 12/2008 | Iochi | H04W 28/22 |
| | | | | 370/345 |
| 2009/0016271 | A1 | 1/2009 | Li et al. | |
| 2009/0017759 | A1 | 1/2009 | Li et al. | |
| 2009/0019165 | A1* | 1/2009 | Li | H04L 1/0002 |
| | | | | 709/227 |
| 2009/0046711 | A1* | 2/2009 | Poikela | H04L 47/10 |
| | | | | 370/389 |
| 2009/0052389 | A1 | 2/2009 | Qin et al. | |
| 2009/0116430 | A1* | 5/2009 | Bonta | H04W 84/18 |
| | | | | 370/329 |
| 2009/0232142 | A1* | 9/2009 | Li | H04W 8/26 |
| | | | | 370/395.3 |
| 2009/0232143 | A1* | 9/2009 | Li | H04W 72/1242 |
| | | | | 370/395.3 |
| 2010/0014452 | A1* | 1/2010 | Ueba | H04W 28/04 |
| | | | | 370/315 |
| 2010/0091724 | A1* | 4/2010 | Ishii | H04W 52/32 |
| | | | | 370/329 |
| 2010/0118772 | A1* | 5/2010 | Cheng | H04L 1/0079 |
| | | | | 370/328 |
| 2011/0222398 | A1* | 9/2011 | Ribeiro et al. | 370/230 |
| 2012/0051315 | A1 | 3/2012 | Wang et al. | |
| 2012/0243431 | A1* | 9/2012 | Chen | H04W 72/0406 |
| | | | | 370/252 |
| 2012/0327760 | A1* | 12/2012 | Du et al. | 370/216 |
| 2013/0145236 | A1* | 6/2013 | Baker | H03M 13/116 |
| | | | | 714/776 |
| 2013/0188479 | A1* | 7/2013 | Pantelidou | H04W 74/008 |
| | | | | 370/229 |
| 2013/0201857 | A1* | 8/2013 | Bhargava | H04K 3/222 |
| | | | | 370/252 |
| 2014/0140296 | A1* | 5/2014 | Choi | H04J 11/0036 |
| | | | | 370/329 |
| 2015/0003375 | A1* | 1/2015 | Liu | H04W 74/0833 |
| | | | | 370/329 |
| 2015/0023185 | A1* | 1/2015 | Bodas et al. | 370/252 |
| 2015/0110033 | A1* | 4/2015 | Yi | H04L 1/0025 |
| | | | | 370/329 |
| 2015/0373651 | A1* | 12/2015 | Ryu | H04W 52/245 |
| | | | | 455/522 |
| 2017/0041867 | A1* | 2/2017 | Itagaki | H04W 52/245 |

FOREIGN PATENT DOCUMENTS

| | | |
|---|---|---|
| CN | 102388666 A | 3/2012 |
| CN | 102404837 A | 4/2012 |
| JP | 2010-537543 A | 12/2010 |
| KR | 10-2010-0050379 A | 5/2010 |
| KR | 10-2010-0096998 A | 9/2010 |
| KR | 10-2011-0033079 A | 3/2011 |

OTHER PUBLICATIONS

Korean Intellectual Property Office; Notice of Patent Grant (with English translation); dated Mar. 13, 2019; Korean Appln. No. Oct. 2012-0066259.

* cited by examiner

METHOD AND APPARATUS FOR TRANSMITTING PACKET IN SYSTEM PERFORMING D2D DIRECT COMMUNICATION

PRIORITY

This application claims the benefit under 35 U.S.C. § 119(a) of a Korean patent application filed in the Korean Intellectual Property Office on Jun. 20, 2012 and assigned Serial No. 10-2012-0066259, the entire disclosure of which is hereby incorporated by reference.

BACKGROUND OF THE INVENTION

1. Field of the Invention

The present invention relates to a system for performing Device to Device (D2D) direct communication. More particularly, the present invention relates to a method and an apparatus for transmitting a packet between devices.

2. Description of the Related Art

Advances in communication and computing technologies have provided users with more sophisticated communication systems. With the continuing development of such communication systems, users desire a service enabling them to easily obtain and share information with other users at anytime. Recently, as smart phones and tablet Personal Computers (PCs) have emerged on the market, an environment that enables a user to obtain and share various information via a wireless communication system has grown in importance. However, the method of obtaining and sharing information of the related art is applicable to only a wireless communication system where an infrastructure has been established. As such, it is difficult to efficiently provide real-time information due to complexity or temporal delay of a wireless communication system.

Accordingly, a Device to Device (D2D) direct communication service has emerged. In the D2D direct communication service, a communication link between devices is formed by directly sharing information in a space where a communication infrastructure has not been established.

Devices supporting the D2D direct communication service preferentially obtain synchronization with a peripheral device and then explore a peripheral device via a determined point and resource to obtain information of the explored peripheral device. After that, respective devices generate a Connection Identifier (CID) for connection with a device to directly communicate based on the obtained peripheral device information. Also, the respective devices perform inter-device connection scheduling, rate scheduling, and traffic transmission based on the generated CID.

FIG. 1 illustrates scheduling and data transmission of a D2D system according to the related art.

As illustrated in FIG. 1, respective devices 111, 112, 113, 114, 115, 116, 117, and 118 perform inter-device connection scheduling 100, rate scheduling 103, and traffic transmission 105 based on generated CIDs. More specifically, devices 111 to 118 transmit/receive signaling and determine whether to transmit/receive data based on an inter-device interference circumstance during a relevant traffic transmission section 105 at the connection scheduling step 100. For example, when each of transmission devices 1 to 4 (111 to 114) transmits signaling for scheduling, each of reception devices 5 to 8 (115 to 118) measures the signal intensity of a corresponding transmission device and the interference signal intensity of a peripheral device based on a CID to determine whether to perform data transmission/reception or abandon data transmission during a relevant traffic transmission section 105 based on the measurement result. At this point, the reception device 7 117 having the same CID as that of the transmission device 3 113 detects an interference signal from the transmission device 1 111 having a CID of a higher priority than that of the CID of the reception device 7 117, and abandons data reception during the relevant data transmission section 105. In contrast, the reception device 6 116 having the same CID as that of the transmission device 2 112 detects an interference signal from the transmission device 4 114 having a CID of a lower priority than that of the CID of the reception device 6 116, but does not abandon data reception during the relevant data transmission section 105 because the CID of the reception device 6 116 is higher. In this case, the transmission device 4 114 that interferes with the reception device 6 116 and the reception device 8 118 abandon data transmission/reception during the relevant data transmission section 105.

As described above, the D2D direct communication service of the related art determines a link to transmit/receive data during a relevant data transmission section via a connection scheduling process. However, this method does not consider the size of data transmitted by each device. Rather, this method uses a resource of a fixed size so that there is a limitation in effective use of a limited resource.

That is, since control of an infrastructure does not exist in the case of a D2D direct communication service, it is difficult to variably operate the size of a transmission resource between devices and, for D2D transmission, a D2D direct communication system uses a resource of a fixed size. Therefore, since the size of transmission data can vary in the D2D direct communication system, there exists a need for an alternative apparatus and method that can effectively utilize a resource depending on the varying size of data.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for transmitting a packet in a system performing Device to Device (D2D) direct communication.

Another aspect of the present invention is to provide a method and an apparatus for increasing the number of transmittable links using a method of informing small packet transmission at a scheduling point in a system performing a D2D direct communication.

Still another aspect of the present invention is to provide a method and an apparatus for representing whether to transmit a small packet by controlling transmission power at a scheduling point in a system performing a D2D direct communication.

Yet another aspect of the present invention is to provide a method and an apparatus for transmitting additional information representing whether a small packet is transmitted at a scheduling point in a system performing a D2D direct communication.

Still yet another aspect of the present invention is to provide a method and an apparatus for dividing and using a resource between small packet transmission devices by allowing each device to inform of whether to transmit a small packet at a scheduling point in a system performing a D2D direct communication.

In accordance with an aspect of the present invention, a method of a transmission device that transmits a packet in a system performing a D2D direct communication is provided. The method includes determining whether to transmit a small packet, and, when determining to transmit the small packet, informing at least one peripheral reception device of whether the small packet will be transmitted at a scheduling point.

In accordance with another aspect of the present invention, a method of a reception device that transmits a packet in a system performing a D2D direct communication is provided. The method includes receiving a signal representing whether a small packet is transmitted from at least one corresponding transmission device at a scheduling point, and determining whether data of the transmission device is receivable.

In accordance with yet another aspect of the present invention, an apparatus of a transmission device that transmits a packet in a system performing a D2D direct communication is provided. The apparatus includes a transceiver for transmitting/receiving a signal to/from at least one peripheral corresponding reception device, and a controller for determining whether to transmit a small packet, and, when determining to transmit the small packet, for controlling a function for informing the at least one peripheral reception device of whether to transmit the small packet at a scheduling point.

In accordance with still another aspect of the present invention, an apparatus of a reception device that transmits a packet in a system performing a D2D direct communication is provided. The apparatus includes a transceiver for transmitting/receiving a signal to/from at least one peripheral corresponding transmission device, and a controller for receiving a signal representing whether a small packet is transmitted from the at least one device and for determining whether data of the corresponding transmission device is receivable.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

Figure 1:
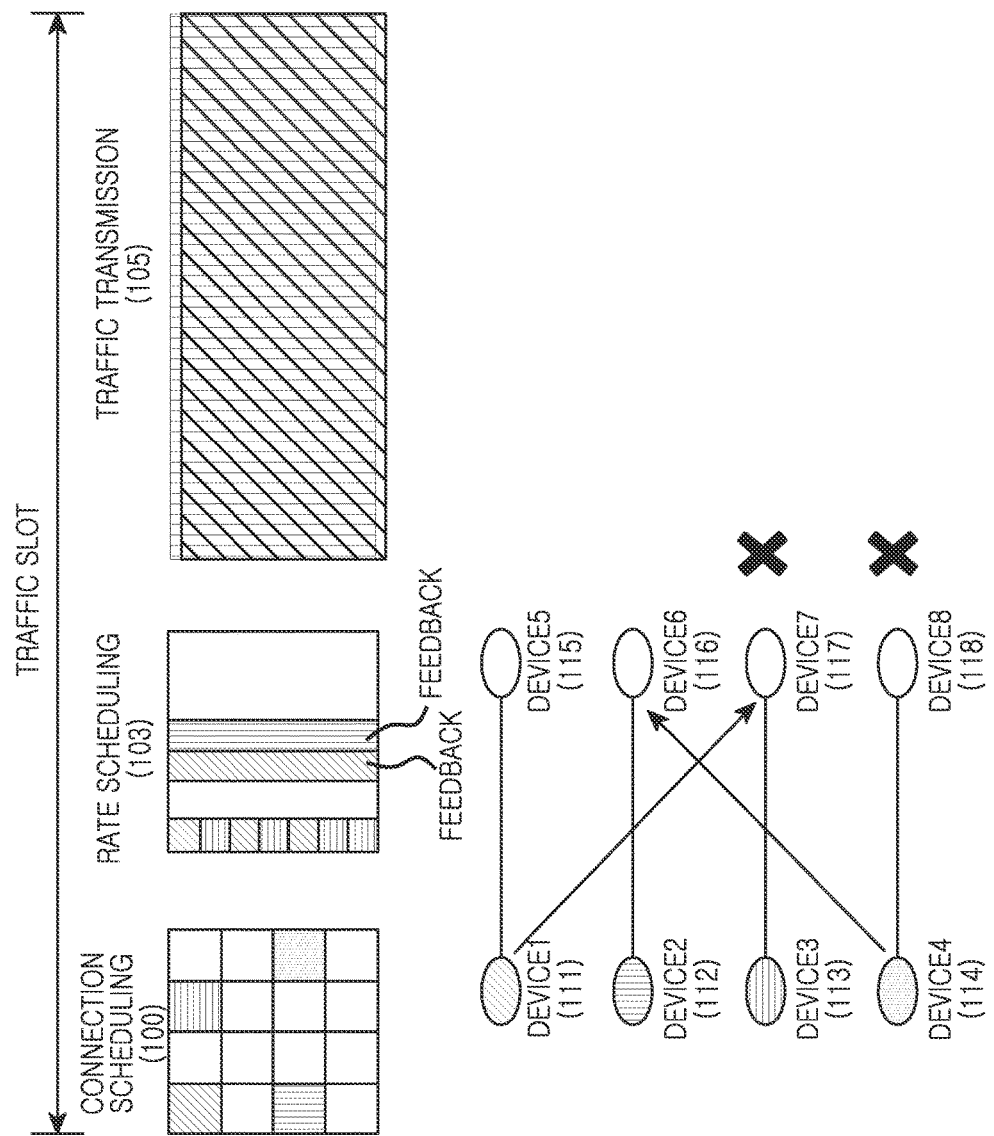
FIG. 1 is a view illustrating scheduling and data transmission of a general Device to Device (D2D) system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a method and an apparatus for transmitting a small packet in a system performing a Device to Device (D2D) direct communication.

A small packet described in the present invention can be determined depending on a reference set in advance based on a transmission rate. More particularly, exemplary embodiments of the present invention determine whether data is a small packet by considering a lowest modulation order and coding rates (i.e., MCS) that can be used for packet transmission. This is for avoiding performance deterioration since each device cannot know a channel state of a link at a scheduling point in a system performing a D2D direct communication.

A system performing a D2D direct communication according to exemplary embodiments of the present invention determines whether data to be transmitted by each device is a small packet and directly or indirectly informs a counterpart device and a peripheral device of whether data is a small packet at a scheduling point. More particularly, each device can inform a counterpart device and a peripheral device of whether data of each device is a small packet in a link for performing data transmission, that is, in a connection scheduling section for selecting devices. Here, a method of indirectly informing whether data is a small packet denotes a method of reducing transmission power of signaling while scheduling between devices is performed. Also, a method of directly informing whether data is a small packet denotes a method of transmitting indication information representing whether data is a small packet using an additional resource while scheduling between devices is performed. Here, informing whether data of each device is a small packet at a scheduling point is for increasing the number of links that transmit data at the same traffic transmission point.

Figure 2A:
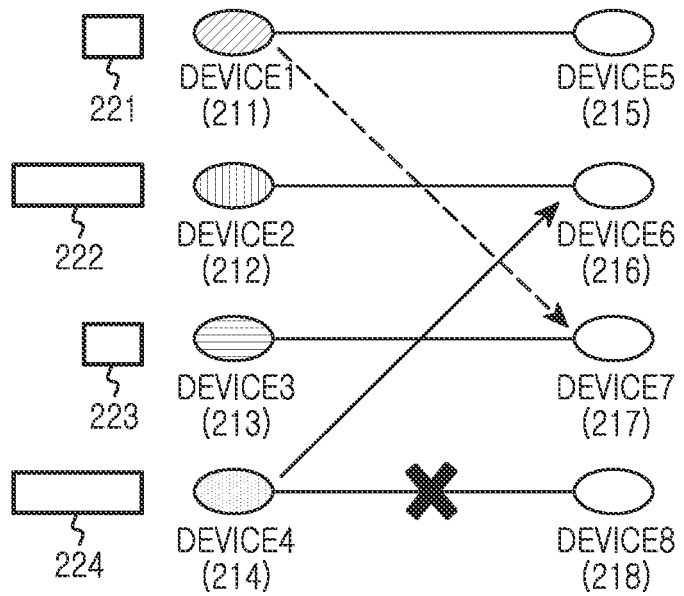
FIG. 2A is a view indirectly illustrating whether a small packet is transmitted between devices in a D2D system according to an exemplary embodiment of the present invention.

FIG. 2A is a view indirectly illustrating whether a small packet is transmitted between devices in a D2D system according to an exemplary embodiment of the present invention.

Referring to FIG. 2A, a device 1 211 and a device 3 213 are scheduled to transmit a small packet to a device 5 215 and a device 7 217, respectively, while a device 2 212 and a device 4 214 are scheduled to transmit a general packet, not a small packet, to a device 216 and a device 218, respectively. Transmission by the device 1 211 interferes with reception by the device 7 217, and transmission by the device 4 214 interferes with reception by the device 6 216.

As illustrated in FIG. 2A, since the device 1 211 and the device 3 213 are scheduled to transmit small packets 221 and 223, respectively, the device 1 211 and the device 3 213 transmit a signal for scheduling using transmission power smaller than transmission power of a case of transmitting a general packet in a connection scheduling step. In contrast, since the device 2 212 and the device 4 214 are scheduled to transmit general packets 222 and 224, respectively, the device 2 212 and the device 4 214 transmit a signal for scheduling using transmission power of a case of transmitting a general packet at a connection scheduling step.

At this point, the device 7 217 having the same Connection Identifier (CID) as that of the device 3 213 receives a signal of the device 3 213 and simultaneously can receive a signal transmitted by the device 1 211 as an interference signal. Here, assuming that the device 1 211 and the device 3 213 use transmission power of a general packet as in the related art, the device 7 217 can determine that reception of data of the device 3 213 is impossible due to interference by a signal of the device 1 211. However, since the device 1 211 has used small transmission power according to exemplary embodiments of the present invention, the intensity of interference of a signal from the device 1 211 over reception of a signal of the device 3 213 is trivial, and the device 7 217 can determine data reception is possible and inform the device 3 213 that data reception is possible.

As described above, exemplary embodiments of the present invention can increase devices participating in data transmission, that is, the number of direct communication links by controlling transmission power at a connection scheduling point and indirectly representing whether a small packet is transmitted between devices.

Figure 2B:
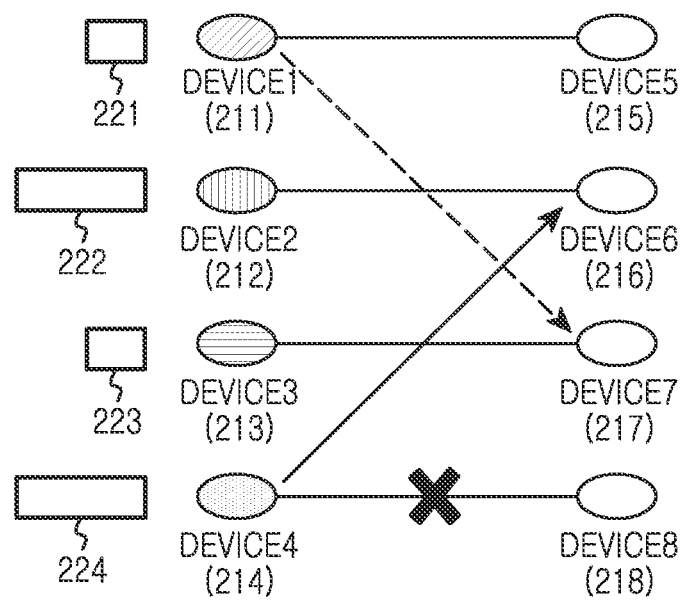
FIG. 2B is a view directly illustrating whether a small packet is transmitted between devices in a D2D system according to an exemplary embodiment of the present invention.

FIG. 2B is a view directly illustrating whether a small packet is transmitted between devices in a D2D system according to an exemplary embodiment of the present invention.

Referring to FIG. 2B, a device 1 211 and a device 3 213 are scheduled to transmit a small packet to a device 5 215 and a device 7 217, respectively, while a device 2 212 and a device 4 214 are scheduled to transmit a general packet, not a small packet, to a device 216 and a device 218, respectively. Transmission by the device 1 211 interferes with reception by the device 7 217, and transmission by the device 4 214 interferes with reception by the device 6 216.

As illustrated in FIG. 2B, since the device 1 211 and the device 3 213 are scheduled to transmit small packets, the device 1 211 and the device 3 213 transmit small packet indication information representing whether data is a small packet using additional resources 231 and 233, respectively. That is, the device 1 211 and the device 3 213 add the additional resources 231 and 233, respectively, to scheduling resources mapped to a relevant CID to inform other devices 215 to 218 of whether a small packet is transmitted. At this point, the additional resources 231 and 233 are added to a time axis, so that signaling is possible without deterioration of transmission/reception performance. In contrast, since the device 2 212 and the device 4 214 are scheduled to transmit a general packet, the device 2 212 and the device 4 214 transmit only a signal for scheduling without using an additional resource. Of course, the device 2 212 and the device 4 214 may also transmit information representing that a small packet is not transmitted using an additional resource depending on a design scheme.

At this point, the device 7 217 having the same CID as that of the device 3 213 receives a signal and small packet indication information of the device 3 213 and simultaneously can receive a signal and small packet indication information transmitted by the device 1 211 as an interference signal. In this case, the device 7 217 can determine the device 1 211 transmits a small packet and determine an amount of interference of the device 1 211 over signal reception of the device 3 213 to determine whether data is receivable based on a threshold interference set in advance for a small packet. At this point, when the amount of interference of the device 1 211 is less than the threshold interference, the device 7 217 can determine data reception is possible and inform the device 3 213 that data reception is possible.

In contrast, in case of using a divided resource for a small packet, the device 7 217 determines that the device 1 211 and the device 3 213 use different divided resources during a traffic transmission section for transmitting actual data. Therefore, since the device 7 217 uses a resource different from a resource of the device 1 211 during a section for transmitting actual data, the device 7 217 ignores an interference of the device 1 211. Here, the divided resource for a small packet should be prescribed and the divided resource should be sequentially allocated to devices having a CID of a high priority among devices that have been informed that a small packet is transmitted.

As described above, exemplary embodiments of the present invention can increase devices participating in data transmission, that is, the number of direct communication links by directly representing whether a small packet is transmitted between devices using an additional resource at a connection scheduling point. Also, exemplary embodiments of the present invention can obtain an interference remove effect, not interference alleviation by other devices by dividing and using resources between small packet transmission devices.

Figure 3A:
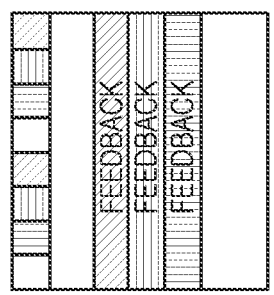
FIG. 3A is a view illustrating a resource usage status of each device in a D2D system according to an exemplary embodiment of the present invention.
Figure 3A:
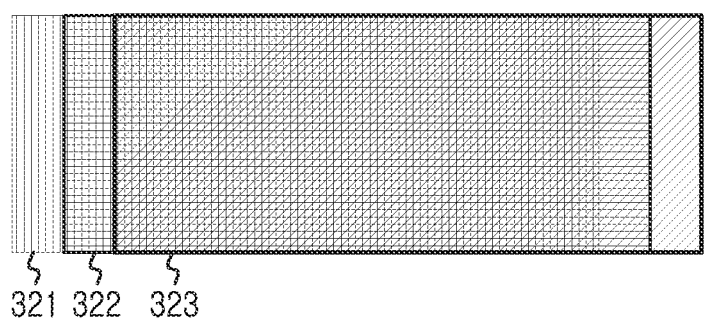
Figure 3B:
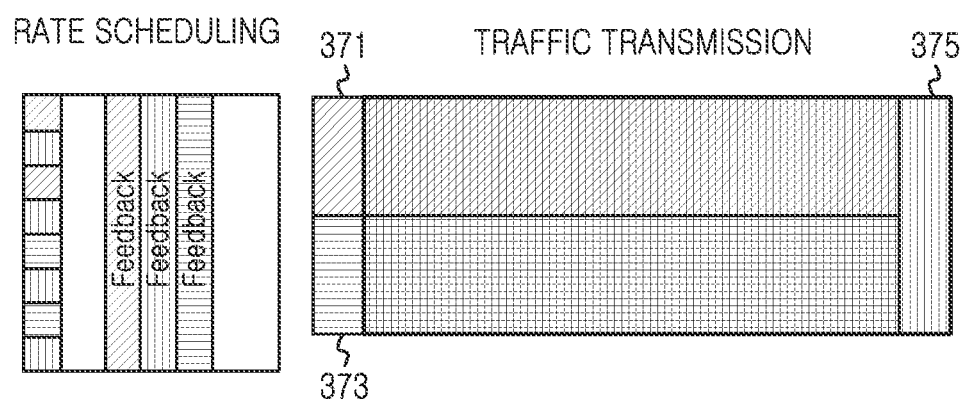
FIG. 3B is a view illustrating a resource usage status of each device in a D2D system according to an exemplary embodiment of the present invention.

FIG. 3A is a view illustrating a resource usage status of each device in a D2D system according to an exemplary embodiment of the present invention. FIG. 3B is a view illustrating a resource usage status of each device in a D2D system according to an exemplary embodiment of the present invention.

As in FIGS. 2A and 2B, devices determining to participate in data transmission may transmit/receive data using a determined entire resource together by controlling transmission power as illustrated in FIG. 3A, and divide the determined entire resource into predetermined sizes and then allow devices corresponding to links for transmitting a small packet to transmit/receive data by using only the divided resource as illustrated in FIG. 3B.

Referring to FIGS. 3A and 3B, in the case where the device 1 211 and the device 5 215, and the device 3 213 and the device 7 217 transmit/receive a small packet, and the device 2 212 and the device 6 216 transmit/receive a general packet, each of the three pairs of devices can transmit/receive data using entire resources 321, 322, and 323 together instead of using a method of controlling transmission power. In contrast, as illustrated in FIG. 3B, the device 2 212 and the device 6 216 transmitting/receiving a general packet can transmit/receive data using the entire resource 375, and the device 1 211 and the device 5 215, and the device 3 213 and the device 7 217, transmitting/receiving a small packet, can transmit/receive data using divided specific resources 371 and 373 without controlling transmission power. Here, the divided resource for a small packet should be prescribed, and the divided resource should be sequentially allocated to devices having a CID of a high priority among devices that have been informed that a small packet is transmitted at a scheduling point.

Figure 4A:
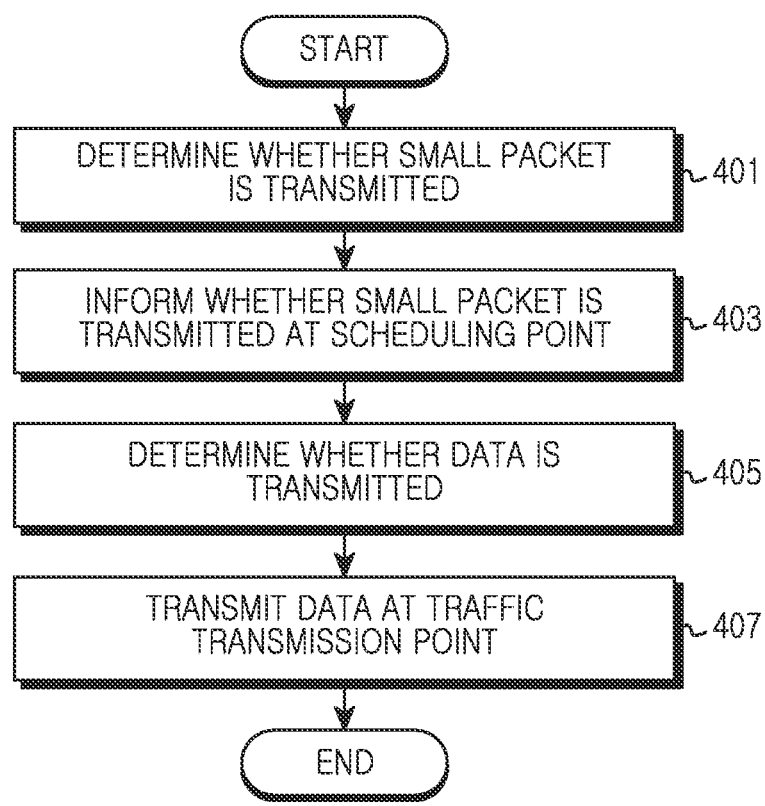
FIG. 4A is a flowchart illustrating a procedure for transmitting data of a transmission device in a D2D system according to an exemplary embodiment of the present invention.

FIG. 4A is a flowchart illustrating a procedure for transmitting data of a transmission device in a D2D system according to an exemplary embodiment of the present invention.

Referring to FIG. 4A, the transmission device determines whether to transmit a small packet in step 401. In an exemplary implementation, the transmission device can determine whether data to transmit to a reception device corresponds to a small packet by considering of a lowest Modulation and Coding Scheme (MCS) that can be used for packet transmission.

In step 403, the transmission device informs other devices of whether to transmit a small packet at a scheduling point. At this point, the transmission device can inform other devices of whether to transmit a small packet via an indirect method of lowering transmission power of a signaling signal or a direct method of transmitting additional indication information when transmitting a signaling signal. Exemplary methods for informing of whether to transmit a small packet is described in more detail with reference to FIGS. 5A, 6A, and 7A.

In step 405, the transmission device receives a signal representing whether data is receivable from a reception device at a scheduling point to determine whether to transmit data. When determining to transmit data, the transmission device transmits data at a traffic transmission point in step 407.

Figure 4B:
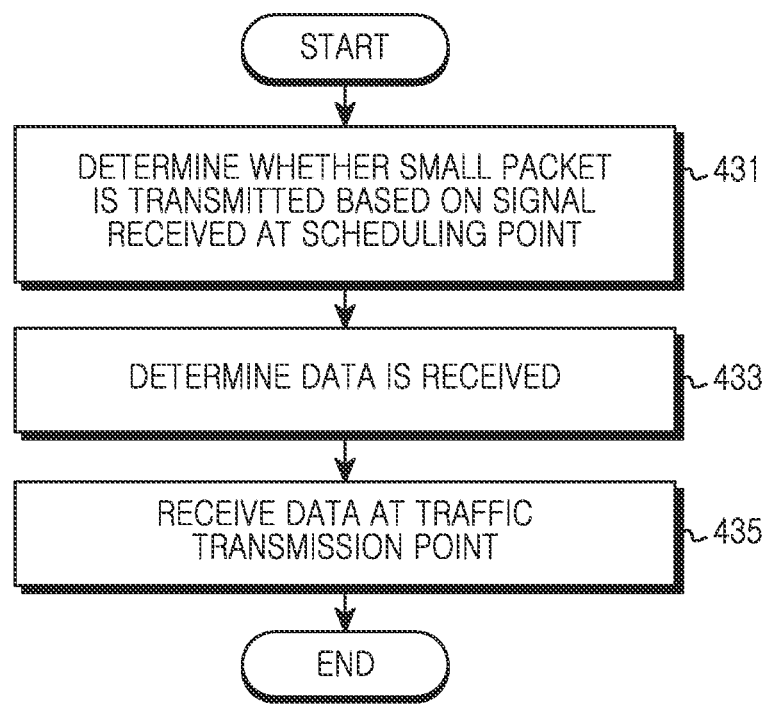
FIG. 4B is a flowchart illustrating a procedure for receiving data of a reception device in a D2D system according to an exemplary embodiment of the present invention.

FIG. 4B is a flowchart illustrating a procedure for receiving data of a reception device in a D2D system according to an exemplary embodiment of the present invention.

Referring to FIG. 4B, the reception device determines whether a corresponding transmission device transmits a small packet based on a signal received at a scheduling point in step 431. The reception device can determine whether a small packet is transmitted via signal reception intensity or additional indication information of the relevant transmission device. At this point, the reception device can determine whether a different transmission device from which a signal is received transmits a small packet at a scheduling point.

In step 433, the reception device determines whether data of the corresponding transmission device is receivable. At this point, the reception device can determine whether to participate in data transmission/reception and a resource to use when participating in data transmission/reception based on whether a transmission device having the same CID as that of the reception device and other transmission devices interfering with the reception device transmit a small packet. A more detailed description thereof is provided below with reference to FIGS. 5B, 6B, and 7B.

In case of participating in data transmission/reception, the reception device receives data from a corresponding transmission device in step 435.

Figure 5A:
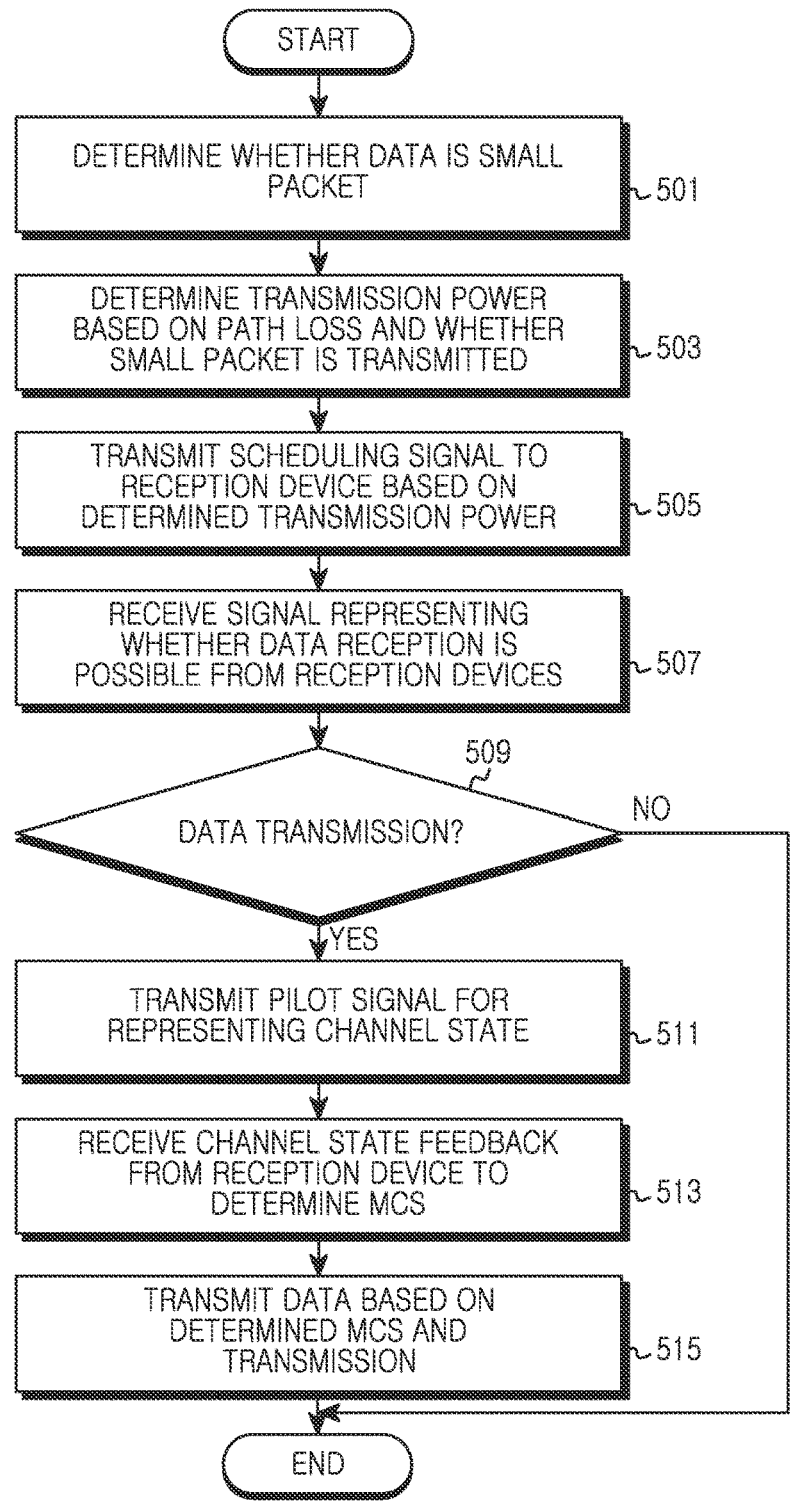
FIG. 5A is a flowchart illustrating a procedure for transmitting data of a transmission device according to an exemplary embodiment of the present invention.
Figure 5B:
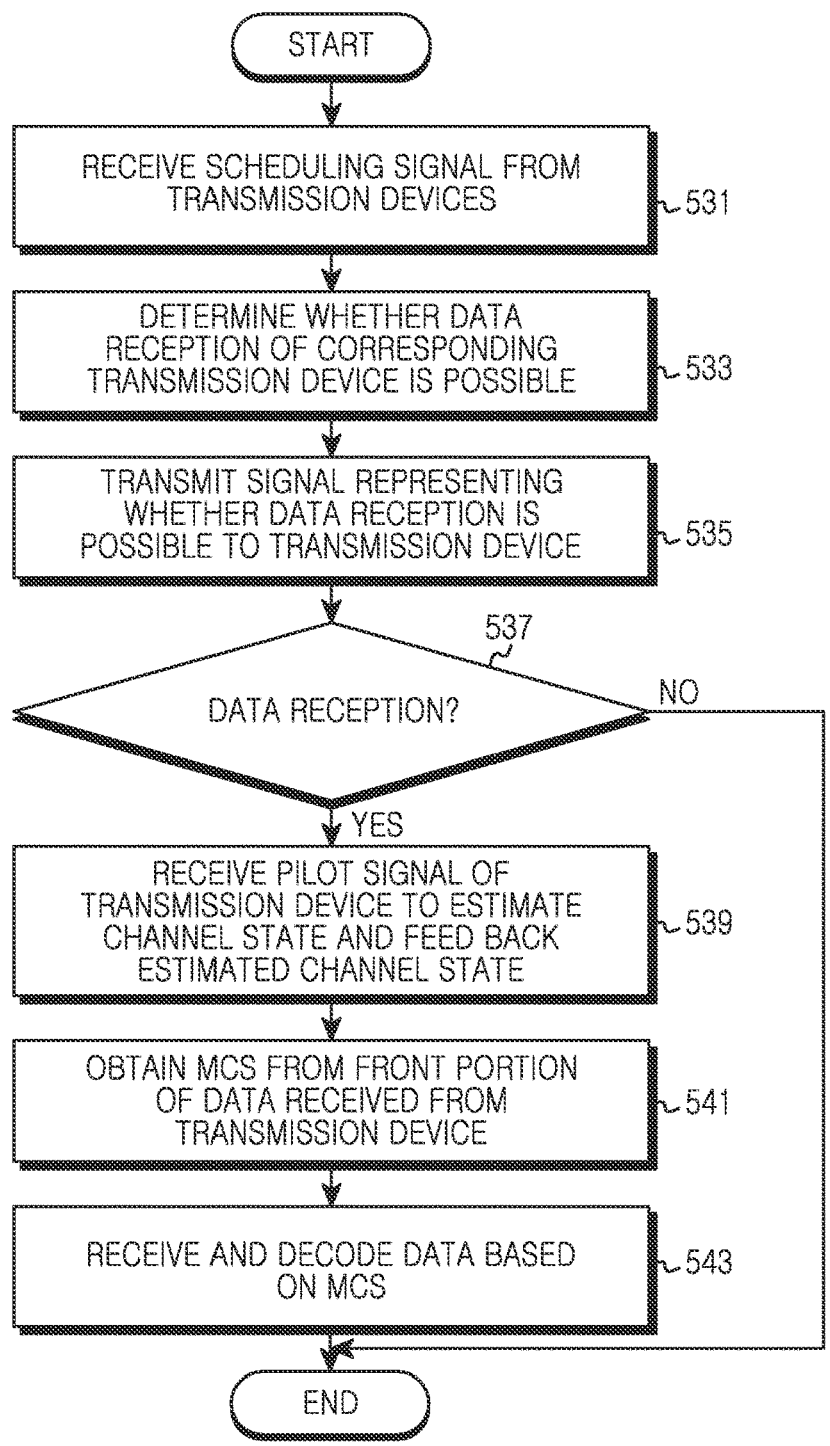
FIG. 5B is a flowchart illustrating a procedure for receiving data of a reception device according to an exemplary embodiment of the present invention.
Figure 6A:
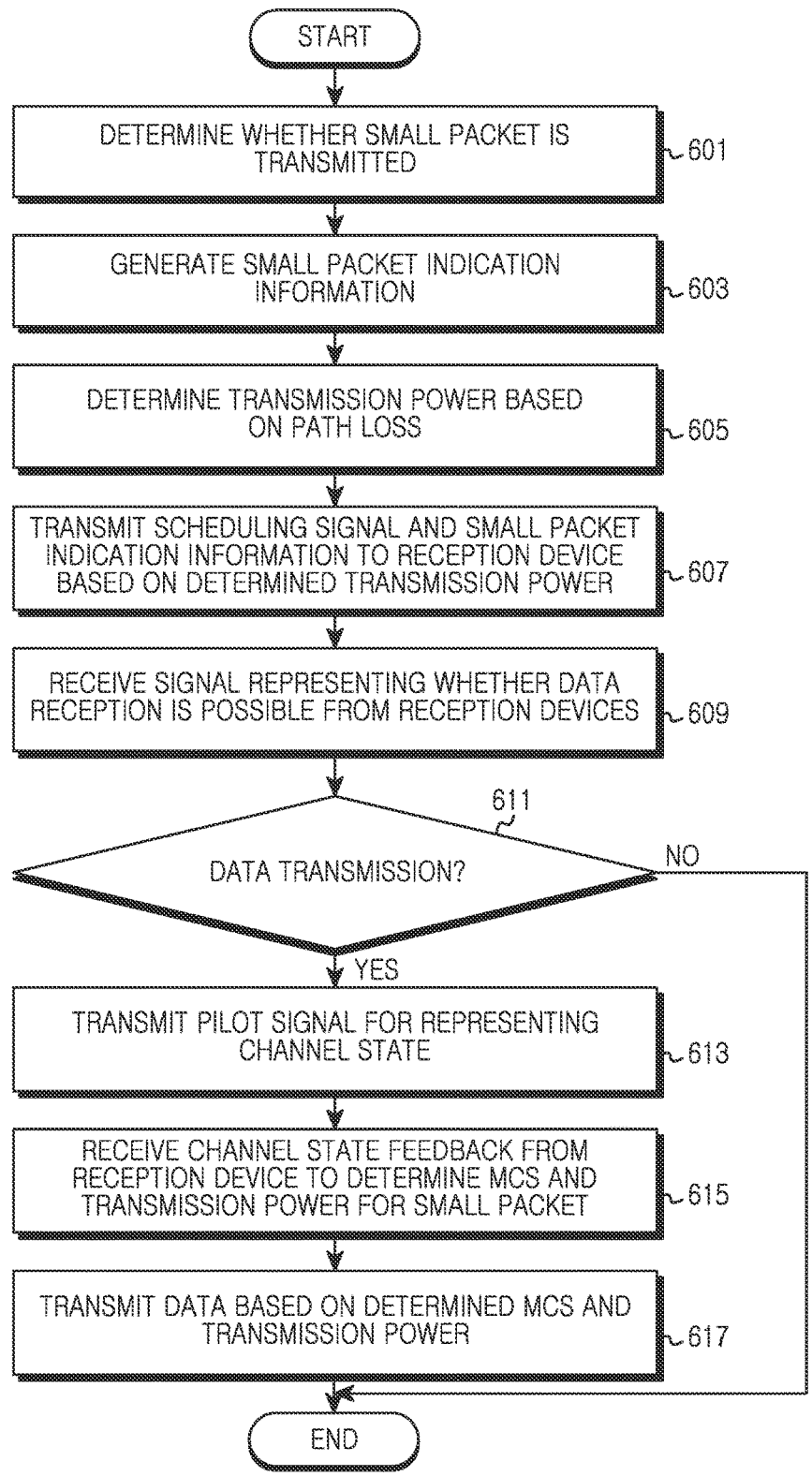
FIG. 6A is a flowchart illustrating a procedure for transmitting data of a transmission device according to an exemplary embodiment of the present invention.
Figure 6B:
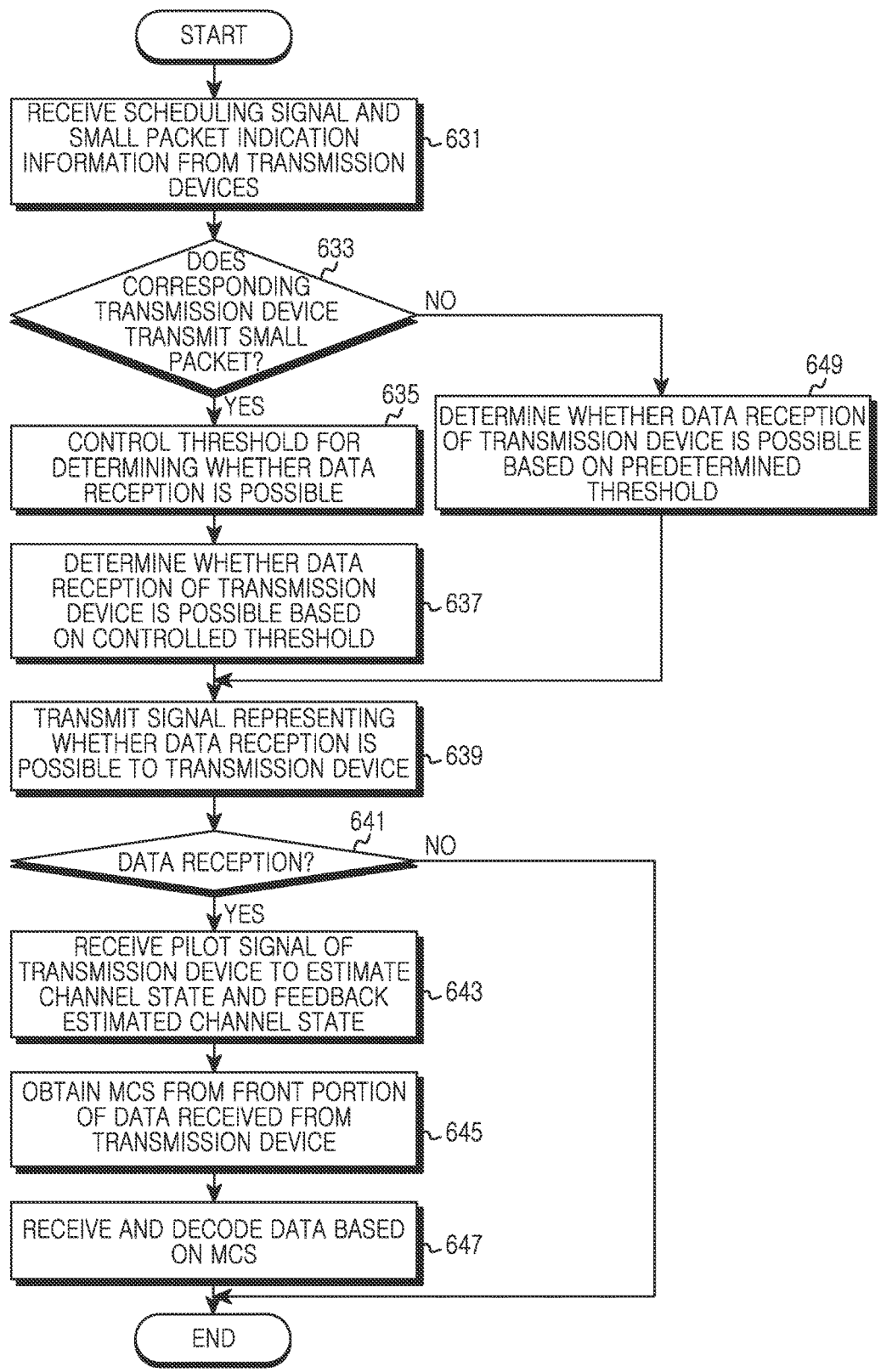
FIG. 6B is a flowchart illustrating a procedure for receiving data of a reception device according to an exemplary embodiment of the present invention.
Figure 7A:
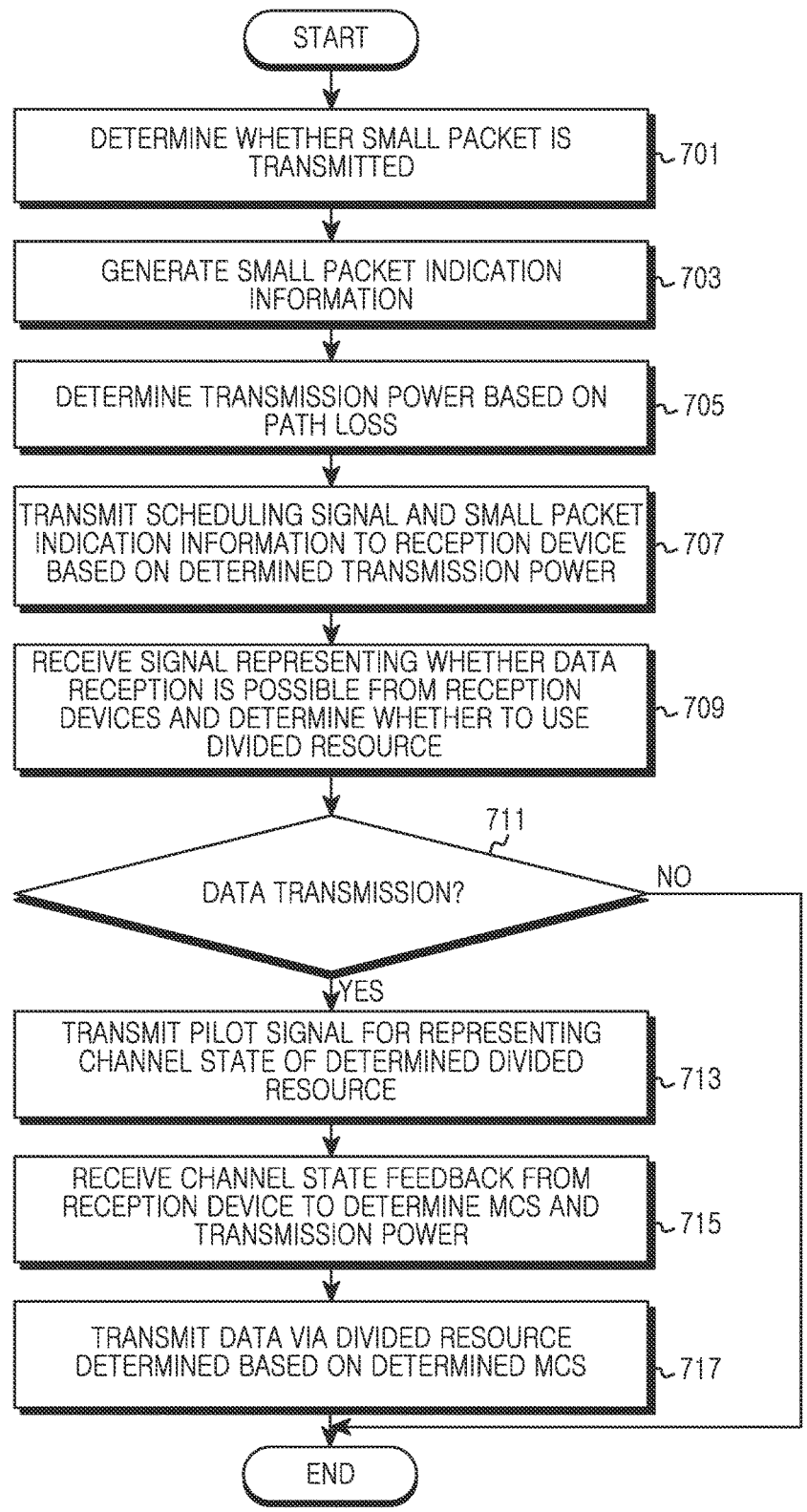
FIG. 7A is a flowchart illustrating a procedure for transmitting data of a transmission device according to an exemplary embodiment of the present invention.
Figure 7B:
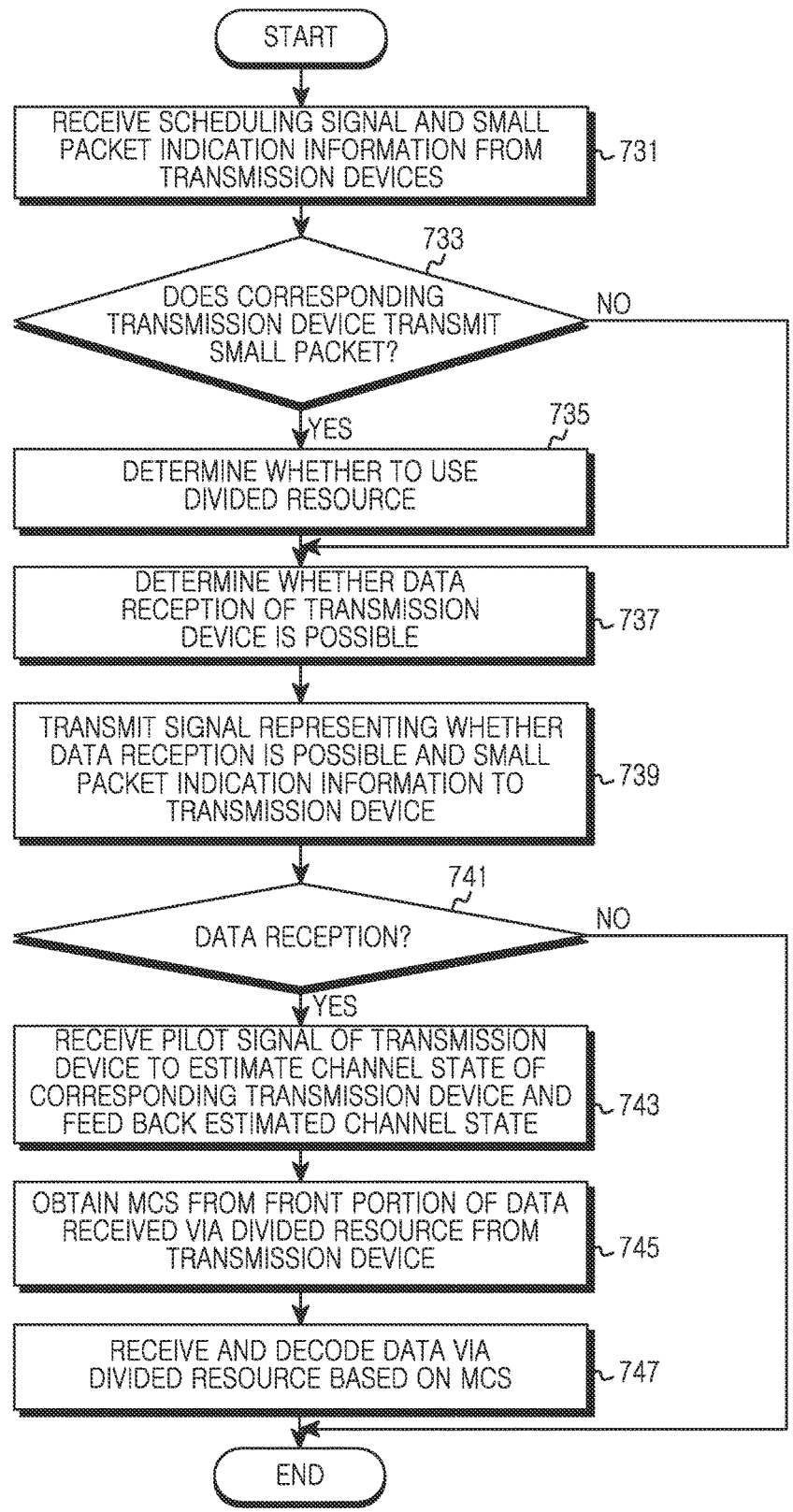
FIG. 7B is a flowchart illustrating a procedure for receiving data of a reception device according to an exemplary embodiment of the present invention.

FIGS. 5A and 5B illustrate an exemplary method for controlling transmission power to inform of whether data is a small packet and transmitting data, and FIGS. 6A and 6B illustrate an exemplary method for informing of whether data is a small packet using additional indication information and controlling transmission power to transmit data. Also, FIGS. 7A and 7B illustrate an exemplary method for informing of whether data is a small packet using additional indication information and transmitting data using a divided resource.

FIG. 5A is a flowchart illustrating a procedure for transmitting data of a transmission device according to an exemplary embodiment of the present invention.

Referring to FIG. 5A, the transmission device determines whether to transmit a small packet in step 501. In an exemplary implementation, the transmission device can determine whether data to transmit to a reception device corresponds to a small packet by considering a lowest MCS that can be used for packet transmission.

In step 503, the transmission device determines transmission power based on a path loss and whether to transmit a small packet. Here, in case of not transmitting a small packet, the transmission device determines transmission power based on a path loss obtained in advance. In contrast, in case of being scheduled to transmit a small packet, the transmission device divides the path loss value obtained in advance by a predetermined small packet parameter to obtain a path loss value that considers a small packet, and determines transmission power based on the obtained path loss value. For example, assuming a case of determining transmission power using a path loss P0 obtained in advance when transmitting a general packet, the transmission device can determine transmission power using a value of P0/S0 when transmitting a small packet. Here, S0 is an allowable scaling value that considers a path loss of a relevant link, and can be determined and selected by a predetermined method.

In step 505, the transmission device transmits a scheduling signal to a reception device at a connection scheduling point based on the determined transmission power. In step 507, the transmission device receives a signal representing whether data is receivable from reception devices.

In step 509, the transmission device determines whether to participate in data transmission. Here, in the case where a signal of a reception device represents that data is receivable, the transmission device can determine to participate in data transmission. In the case where a signal of a reception device represents that data reception is impossible, the transmission device can determine not to participate in data transmission. In case of determining not to participate in data transmission, the transmission device ends the algorithm according to the present invention.

In contrast, when determining to participate in data transmission, the transmission device proceeds to step 511 to transmit a pilot signal for representing a channel state at a rate scheduling point, and receives feedback information representing a channel state from a reception device and determines an MCS based on the received channel state information in step 513.

In step 515, the transmission device transmits data to the reception device at a traffic transmission point based on the MCS determined in step 513 and the transmission power determined in step 503. At this point, the transmission device can add information regarding the MCS to the front portion of data and transmit the same.

After that, the transmission device ends the algorithm according to the present invention.

FIG. 5B is a flowchart illustrating a procedure for receiving data of a reception device according to an exemplary embodiment of the present invention.

Referring to FIG. 5B, the reception device receives a scheduling signal from transmission devices at a connection scheduling point in step 531 and proceeds to step 533 to determine whether data of a corresponding transmission device is receivable. Here, the reception device can compare a ratio of a signal reception intensity of the transmission device corresponding to a CID of the reception device and a signal reception intensity of other transmission devices with a predetermined threshold, and determine whether data of the corresponding transmission device is receivable based on the comparison result.

In step 535, the reception device transmits a signal representing whether data is receivable to the transmission device at a connection scheduling point.

In step 537, the reception device determines whether to participate in data reception. Here, when data reception of the corresponding transmission device is possible, the reception device can determine to participate in data transmission/reception. When data reception of the transmission device is impossible, the reception device can determine not to participate in data transmission/reception. When determining not to participate in the data transmission/reception, the reception device ends the algorithm according to the present invention.

In step 539, the reception device estimates a channel state of the corresponding transmission device at a rate scheduling point and feeds back the estimated channel state information to the transmission device.

In step 541, the reception device obtains MCS information from the front portion of data received from the transmission device at a traffic transmission point, and receives and decodes data from the transmission device based on the MCS information in step 543. After that, the transmission device ends the algorithm according to the present invention.

FIG. 6A is a flowchart illustrating a procedure for transmitting data of a transmission device according to an exemplary embodiment of the present invention.

Referring to FIG. 6A, the transmission device determines whether to transmit a small packet in step 601. Here, the transmission device can determine whether data to transmit to a reception device corresponds to a small packet by considering a lowest MCS that can be used for packet transmission.

In step 603, the transmission device generates small packet indication information representing whether to transmit a small packet, and determines transmission power based on a path loss obtained in advance in step 605.

In step 607, the transmission device transmits a scheduling signal and the small packet indication information to the reception device at a connection scheduling point based on the determined transmission power. The transmission device adds an additional resource to a scheduling resource mapped to a relevant CID and transmits the small packet indication information to the reception device. At this point, the additional resource is added to a time axis, so that signaling is possible without deterioration of transmission/reception performance.

In step 609, the transmission device receives a signal representing whether data reception is possible from reception devices. In step 611, the transmission device determines whether to participate in data transmission. Here, in the case where a signal of a reception device represents data reception is possible, the transmission device determines to participate in data transmission. In the case where a signal of a reception device represents data reception is impossible, the transmission device determines not to participate in data transmission. When determining not to participate in data transmission, the transmission device ends the algorithm according to the present invention.

In contrast, when determining to participate in data transmission, the transmission device transmits a pilot signal for representing a channel state at a rate scheduling point in step 613. In step 615, the transmission device receives feedback information representing a channel state from a reception device and determines an MCS and transmission power for a small packet based on the received channel state information. Here, the transmission device scheduled to transmit a small packet divides a path loss value obtained in advance by a predetermined small packet parameter to obtain a path loss value that considers a small packet, and determines transmission power based on the obtained path loss value. For example, assuming a case of determining transmission power using a path loss P0 obtained in advance when transmitting a general packet, the transmission device can determine transmission power using a value of P0/S0 when transmitting a small packet. In contrast, in the case where the transmission device does not transmit a small packet, the transmission device omits an operation of determining transmission power and uses the transmission power determined in step 605.

In step 617, the transmission device transmits data to a reception device at a traffic transmission point based on the MCS and the transmission power determined in step 615. At this point, the transmission device can add information regarding the MCS to the front portion of data and transmit the same.

After that, the transmission device ends the algorithm according to the present invention.

FIG. 6B is a flowchart illustrating a procedure for receiving data of a reception device according to an exemplary embodiment of the present invention.

Referring to FIG. 6B, the reception device receives a scheduling signal and small packet indication information from transmission devices at a connection scheduling point in step 631. In step 633, the reception device determines whether a corresponding transmission device transmits a small packet. The reception device can determine that the corresponding transmission device transmits a small packet when small packet indication information is received from the corresponding transmission device depending on a design scheme, or determine whether the transmission device transmits a small packet via a value of the small packet indication information received from the corresponding transmission device. When the corresponding transmission device does not transmit a small packet, the reception device proceeds to step 649 to determine whether data reception of the transmission device is possible based on a predetermined threshold and immediately proceeds to step 639.

In contrast, when the corresponding transmission device transmits a small packet, the reception device proceeds to step 635 to control the threshold for determining whether data reception is possible according to a predetermined method, and determines whether data reception of the transmission device is possible based on the controlled threshold in step 637. Here, the reception device can compare a ratio of a signal reception intensity of the transmission device corresponding to a CID of the reception device and a signal reception intensity of other transmission devices with a threshold, and determine whether data of the corresponding transmission device is receivable based on the comparison result.

In step 639, the reception device transmits a signal representing whether data reception is possible to the transmission device at a connection scheduling point.

In step 641, the reception device determines whether to participate in data reception. Here, when data reception of the corresponding transmission device is possible, the reception device can determine to participate in data transmission/reception. When data reception of the transmission device is impossible, the reception device can determine not to participate in data transmission/reception. When determining not to participate in data transmission/reception, the reception device ends the algorithm according to the present invention.

In step 643, the reception device estimates a channel state of the corresponding transmission device at a rate scheduling point and feeds back the estimated channel state information to the transmission device.

In step 645, the reception device obtains MCS information from the front portion of data received from the transmission device at a traffic transmission point, and receives and decodes data from the transmission device based on the MCS information in step 647. After that, the transmission device ends the algorithm according to the present invention.

FIG. 7A is a flowchart illustrating a procedure for transmitting data of a transmission device according to an exemplary embodiment of the present invention.

Referring to FIG. 7A, the transmission device determines whether to transmit a small packet in step 701. Here, the transmission device can determine whether data to transmit to a reception device corresponds to a small packet by considering a lowest MCS that can be used for packet transmission.

In step 703, the transmission device generates small packet indication information representing whether a small packet is transmitted, and determines transmission power based on a path loss obtained in advance in step 705.

In step 707, the transmission device transmits a scheduling signal and the small packet indication information to a reception device at a connection scheduling point based on the determined transmission power. At this point, the transmission device adds an additional resource to a scheduling resource mapped to a relevant CID and transmits the small packet indication information to the reception device. At this point, the additional resource is added to a time axis, so that signaling is possible without deterioration of transmission/reception performance.

In step 709, the transmission device receives a signal representing whether data is receivable from reception devices and determines whether to use a divided resource based on the received signal. Here, the signal from the reception devices representing whether data is receivable can include small packet indication information. Accordingly, the transmission device determines whether to participate in data transmission based on whether data reception from a corresponding reception device is possible, and determines whether to use a divided resource based on small packet indication information from reception devices. At this point, the transmission device can determine whether to use a divided resource and a divided resource to use by determining links transmitting/receiving a small packet based on the small packet indication information and sequentially allocating predetermined divided resources to respective links according to the priority of each link transmitting/receiving a small packet. Here, in the case where the transmission device does not transmit a small packet, the process for determining whether to use a divided resource can be omitted.

In step 711, the transmission device determines whether to participate in data transmission. When determining not to participate in data transmission, the transmission device ends the algorithm according to the present invention.

In contrast, when participating in data transmission, the transmission device proceeds to step 713 to transmit a pilot signal for representing a channel state at a rate scheduling point. In step 715, the transmission device receives feedback information representing the channel state from a reception device and determines an MCS and transmission power based on the received channel state information. Here, the transmission device determines transmission power based on a path loss value obtained in advance regardless of whether a small packet is transmitted.

In step 717, the transmission device transmits data to the reception device at a traffic transmission point via the resource determined in step 709 based on the MCS and the transmission power determined in step 715. At this point, the transmission device can add information regarding the MCS to the front portion of data and transmit the same.

After that, the transmission device ends the algorithm according to the present invention.

FIG. 7B is a flowchart illustrating a procedure for receiving data of a reception device according to an exemplary embodiment of the present invention.

Referring to FIG. 7B, the reception device receives a scheduling signal and small packet indication information from transmission devices at a connection scheduling point in step 731, and proceeds to step 733 to determine whether a transmission device transmits a small packet. The reception device can determine that the corresponding transmission device transmits a small packet when small packet indication information is received from the corresponding transmission device depending on a design scheme, or determine whether the transmission device transmits a small packet via a value of the small packet indication information received from the corresponding transmission device. When the corresponding transmission device does not transmit a small packet, the reception device immediately proceeds to step 737

In contrast, when the corresponding transmission device transmits a small packet, the reception device proceeds to step 735 to determine whether to use a divided resource. At this point, the reception device can determine whether to use a divided resource and a divided resource to use by determining links transmitting/receiving a small packet based on the small packet indication information from transmission devices and sequentially allocating predetermined divided resources to respective links according to the priority of each link transmitting/receiving a small packet.

In step 737, the reception device determines whether data reception of the transmission device is possible. Here, in the case where the reception device uses a divided resource, the reception device determines an interference circumstance for a divided resource to use and determines whether data reception is possible.

In step 739, the reception device transmits a signal representing whether data reception is possible and small packet indication information to a transmission device at a connection scheduling point. Here, the reception device transmits the small packet indication information to the transmission device to allow respective transmission devices to recognize whether each link participating in data transmission transmits a small packet.

In step 741, the reception device determines whether to participate in data reception. Here, when data reception of a corresponding transmission device is possible, the reception device can determine to participate in data transmission/reception. When data reception of the transmission device is impossible, the reception device can determine not to participate in data transmission/reception. When determining not to participate in the data transmission/reception, the reception device ends the algorithm according to the present invention.

In step 743, the reception device estimates a channel state of the corresponding transmission device at a rate scheduling point and feeds back the estimated channel state information to the transmission device.

In step 745, the reception device obtains MCS information from the front portion of data received from the transmission device at a traffic transmission point. In step 747, the reception device receives and decodes data from the transmission device based on the MCS information. At this point, the reception device can receive data via the divided resource determined in step 735. After that, the transmission device ends the algorithm according to the present invention.

Figure 8:
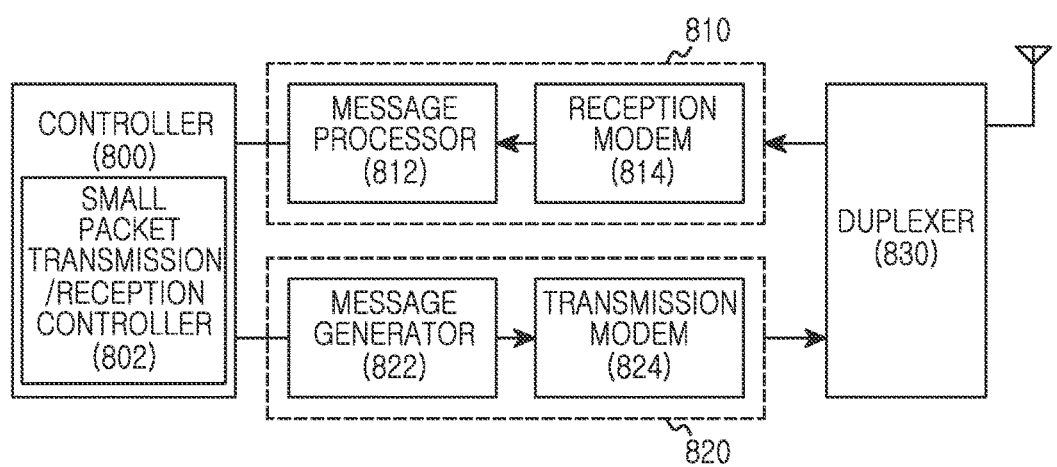
FIG. 8 is a block diagram illustrating a device according to an exemplary embodiment of the present invention.

FIG. 8 is a block diagram illustrating a device according to an exemplary embodiment of the present invention.

As illustrated in FIG. 8, the device includes a controller 800, a receiver 810, a transmitter 820, and a duplexer 830.

The controller 800 controls an overall operation of the device. More specifically, for D2D direct communication, the controller 800 directly or indirectly informs of small packet transmission when transmitting a small packet via a small packet transmission/reception controller 802 as illustrated in FIGS. 2A and 2B, and controls and processes a function for using a resource depending on whether a small packet is transmitted as illustrated in FIGS. 3A and 3B.

In an exemplary implementation, the small packet transmission/reception controller 802 determines whether the device transmits a small packet to control and process a function for informing other devices of whether the small packet is transmitted at a connection scheduling point. At this point, the small packet transmission/reception controller 802 controls to inform other devices of whether the small packet is transmitted via an indirect method of lowering transmission power of a signaling signal or a direct method of transmitting additional indication information when transmitting a signaling signal. Here, the small packet transmission/reception controller 802 informs of whether the small packet is transmitted at a connection scheduling point to increase the number of links transmitting data at the same traffic transmission point. After that, the small packet transmission/reception controller 802 receives a signal representing whether data reception is possible from a corresponding reception device to determine whether to participate in data transmission. At this point, the small packet transmission/reception controller 802 can determine whether to transmit data via transmission power control or whether to transmit data using a divided resource when transmitting a small packet, and determine transmission power or determine a divided resource to use depending on the determination result. After that, the small packet transmission/reception controller 802 controls and processes a function for transmitting data at a traffic transmission point via the determined transmission power and the determined resource. Also, the small packet transmission/reception controller 802 determines whether a corresponding transmission device transmits a small packet, whether data of the transmission device is receivable, and whether to use a divided resource, and determines a divided resource to use, etc. to control and process a function for receiving data. That is, the small packet transmission/reception controller 802 controls and processes a function for allowing the relevant device to perform the operations illustrated in FIGS. 2A to 7B.

The receiver 810 receives data and a control information message transmitted by peripheral devices from the duplexer 830. For example, the receiver 810 includes a reception modem 814 and a message processor 812.

The reception modem 814 converts the data and the control information message transmitted by the peripheral devices provided from the duplexer 830 to a baseband digital signal. The message processor 812 analyzes the data and the control information message provided by the reception modem 814 to transmit the same to the controller 800. For example, the message processor 812 extracts small packet indication information and information representing whether data is receivable from a signal received at a connection scheduling point to provide the same to the controller 800.

The transmitter 820 transmits a message including data and control information to transmit to peripheral devices to the duplexer 830. For example, the transmitter 820 includes a message generator 822 and a transmission modem 824.

The message generator 822 generates a message including data and control information to transmit to a corresponding reception device under control of the controller 800. For example, the message generator 822 generates a message including small packet indication information or a message indicating whether data is receivable. The transmission modem 824 converts a message to transmit to peripheral devices so that the message may be transmitted via a radio resource, and transmits the same to the duplexer 830.

The duplexer 830 transmits a transmission signal provided from the transmitter 820 via an antenna and provides a reception signal from the antenna to the receiver 820 according to a duplexing scheme.

Exemplary embodiments of the present invention can increase the number of links than can transmit data and thus improve performance by directly or indirectly informing of whether a small packet is transmitted at a scheduling point in a system performing D2D direct communication. Also, exemplary embodiments of the present invention can obtain an interference removal effect, not interference alleviation by other devices, by informing of small packet transmission at a scheduling point and dividing and using a resource between small packet transmission devices in a system performing D2D direct communication.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for operating a device in a device-to-device (D2D) direct communication system, the method comprising:
   transmitting, to a peer device, a signal for scheduling data transmission for the peer device during a scheduling interval;
   receiving, from the peer device, a response for the signal indicating that the peer device is available to receive data from the device during a transmission interval after the scheduling interval; and
   transmitting, to the peer device, the data during the transmission interval based on the response,
   wherein whether the peer device is available to receive the data from the device is determined based on another signal for indicating a size of a packet,
   wherein the another signal is transmitted from another device during the scheduling interval and the packet is transmitted from the another device during the transmission interval, and
   wherein the size of the packet is indicated by a transmission power of the another signal.

2. The method of claim 1,
   wherein the transmission power of the another signal is determined to be lower in a case where a small packet is to be transmitted during the transmission interval than in a case where an ordinary packet is to be transmitted during the transmission interval, and
   wherein a size of the small packet is smaller than a size of the ordinary packet.

3. The method of claim 1,
   wherein the size of the packet is indicated based on a use of an additional resource to transmit the another signal.

4. The method of claim 1, further comprising:
   transmitting, to the peer device, a pilot signal in response to receiving the response from the peer device; and
   receiving information regarding a channel between the device and the peer device, which is estimated based on the pilot signal.

5. A method for operating a device in a device-to-device (D2D) direct communication system, the method comprising:
   receiving a signal for scheduling data transmission for the device from a peer device during a scheduling interval, and another signal from another device during the scheduling interval;
   determining whether the device is available to receive data from the peer device during a transmission interval after the scheduling interval based on a transmission power of the another signal;
   transmitting, to the peer device, a response for the signal indicating that the device is available to receive the data from the peer device; and
   receiving, from the peer device, the data during the transmission interval according to the response,
   wherein the transmission power of the another signal is determined based on a size of a packet, the packet being to be transmitted from the another device during the transmission interval.

6. The method of claim 5,
   wherein the transmission power of the another signal is determined to be lower in a case where a small packet is to be transmitted during the transmission interval than in a case where an ordinary packet is to be transmitted during the transmission interval, and
   wherein a size of the small packet is smaller than a size of the ordinary packet.

7. An apparatus of a device in a device-to-device (D2D) direct communication system, the apparatus comprising:
   a transceiver; and
   at least one processor configured to:
      transmit, to a peer device, a signal for scheduling data transmission for the peer device during a scheduling interval,
      receive, from the peer device, a response for the signal indicating that the peer device is available to receive data from the device during a transmission interval after the scheduling interval, and
      transmit, to the peer device, the data during the transmission interval based on the response,
   wherein whether the peer device is available to receive the data from the device is determined based on a transmission power of another signal, the another signal being transmitted from another device during the scheduling interval, and
   wherein the transmission power of the another signal is determined based on a size of a packet, the packet being to be transmitted from the another device during the transmission interval.

8. The apparatus of claim 7,
   wherein the transmission power of the another signal is determined to be lower in a case where a small packet is to be transmitted during the transmission interval than in a case where an ordinary packet is to be transmitted during the transmission interval, and
   wherein a size of the small packet is smaller than a size of the ordinary packet.

9. The apparatus of claim 7,
   wherein the size of the packet is indicated based on a use of an additional resource to transmit the another signal.

10. The apparatus of claim 7, wherein the at least one processor is further configured to:
    transmit, to the peer device, a pilot signal in response to receiving the response from the peer device, and
    receive information regarding a channel between the device and the peer device, which is estimated based on the pilot signal.

11. An apparatus of a device in a device-to-device (D2D) direct communication system, the apparatus comprising:
    a transceiver; and
    at least one processor configured to:
       receive a signal for scheduling data transmission for the device from a peer device during a scheduling interval, and another signal from another device during the scheduling interval,
       determine whether the device is available to receive data from the peer device during a transmission interval after the scheduling interval based on a transmission power of the another signal, transmit, to the peer device, a response for the signal indicating that the device is available to receive the data from the peer device, and receive, from the peer device, the data during the transmission interval according to the response, wherein the transmission power of the another signal is determined based on a size of a packet, the packet being to be transmitted from the another device during the transmission interval.

12. The apparatus of claim 11, wherein the transmission power of the another signal is determined to be lower in a case where a small packet is to be transmitted during the transmission interval than in a case where an ordinary packet is to be transmitted during the transmission interval, and wherein a size of the small packet is smaller than a size of the ordinary packet.

13. The method of claim 2, wherein the small packet is transmitted using a transmission power that is smaller than that of the ordinary packet.

14. The method of claim 1, wherein the packet is transmitted using a resource that is determined based on a priority of a connection for the another device.

15. The method of claim 6, wherein the small packet is transmitted using a transmission power that is smaller than that of the ordinary packet.

16. The method of claim 5, wherein the packet is transmitted using a resource that is determined based on a priority of a connection for the another device.

17. The apparatus of claim 8, wherein the small packet is transmitted using a transmission power that is smaller than that of the ordinary packet.

18. The apparatus of claim 7, wherein the packet is transmitted using a resource that is determined based on a priority of a connection for the another device.

19. The apparatus of claim 12, wherein the small packet is transmitted using a transmission power that is smaller than that of the ordinary packet.

20. The apparatus of claim 11, wherein the packet is transmitted using a resource that is determined based on a priority of a connection for the another device.

* * * * *